Nov. 21, 1950  F. C. SCHNABEL  2,530,910
CAKE CONTAINER AND SERVER
Filed May 1, 1947  2 Sheets-Sheet 1
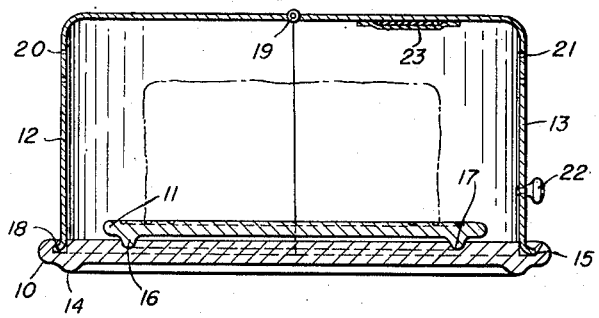
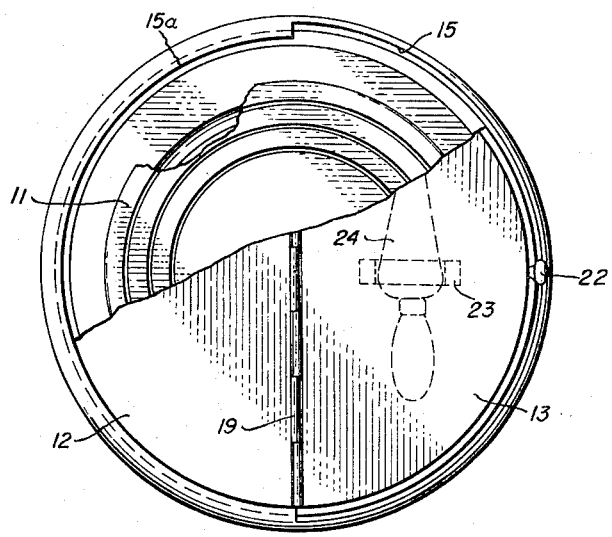
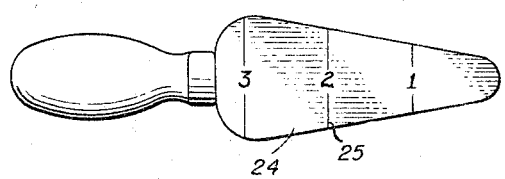
Inventor
FRED C. SCHNABEL Nov. 21, 1950   F. C. SCHNABEL   2,530,910
CAKE CONTAINER AND SERVER Filed May 1, 1947   2 Sheets-Sheet 2

Inventor
FRED C. SCHNABEL
By Nathaniel Frucht
atty.

Patented Nov. 21, 1950

2,530,910

UNITED STATES PATENT OFFICE 2,530,910

CAKE CONTAINER AND SERVER

Fred C. Schnabel, Hopkins, Minn.

Application May 1, 1947, Serial No. 745,129

3 Claims. (Cl. 45—71)

The present invention relates to food containers, and has particular reference to cake or pie containers of the type having a circular base with a cylindrical shaped cover.

The principal object of the invention is to provide a combination cake or pie container in which a cake, pie, or other pastries may be kept fresh and soft and from which the cake or pie may be served.

Another object of this invention is, therefore, to provide a combination cake or pie storing and serving container which saves valuable space on the dinner table, and which may readily be opened to serve cake or pie therefrom, and then readily closed.

An additional object of the invention is to provide a cake or pie serving container in which means is provided for projecting the cake or pie from the container as it is served.

Still another object of the invention is to provide in combination with a cake or pie serving container, a scaled knife that may be used to measure the size of a slice of cake or pie.

An additional object of the invention is to provide a combination storing and serving container wherein a cake, pie or other pastries is held on an inner rotatable plate or stand on a base and the cover is hinged at the center so that one-half thereof folds back upon the other half.

A further object of the invention is to provide a combination cake or pie storing and serving container which is of a simple and economical construction.

With these and other objects and advantageous features in view, the invention resides in a novel arrangement of parts more fully described in the detailed specification following, in conjunction with the drawings forming part thereof, and more specifically defined in the claims appended thereto.

In the drawings:

Fig. 1 is a plan view of the combination cake or pie container, part of the cover being broken away to show the interior of the container;

Fig. 2 is a cross-section through the container;

Fig. 3 is a plan view of the graduated cake knife;

Figure 4:
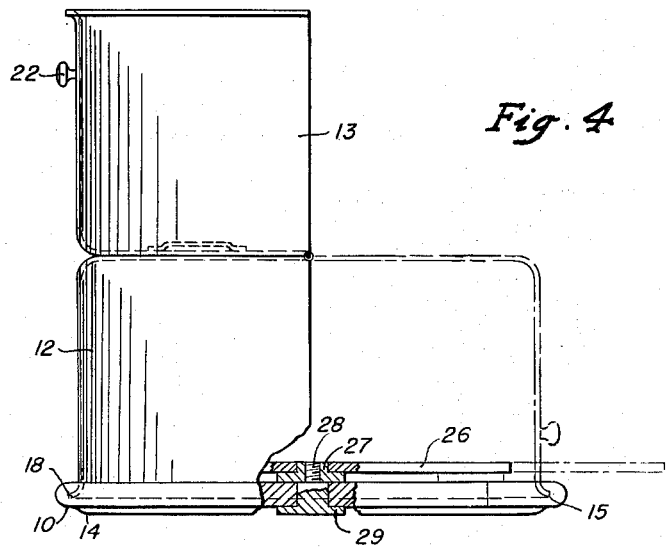
Fig. 4 is a view showing a container of an alternate design with the cover open and with parts broken away and shown in section, the cake or pie plate being pivotally mounted on a spindle that is slidable in a slot in the base.

It has been found that when cakes and pies are placed in the conventional type containers, and it is desired to serve the cake or pie, the container is placed on an already crowded dinner table. The cover is removed and space must be found on the table for it, then the cake or pie is removed from the container and a space must be found for the cake or pie being served. The container, cover, and plate with the cake or pie thereon take up considerable area on the table, and the invention provides a cake or pie container in which all of the elements remain in one spot and therefore cover only a comparatively small table area.

Referring to the drawings, I have disclosed preferred embodiments of the invention; the container includes a base 10, a cake or pie plate 11, and a cover formed of two hingedly connected sections 12 and 13.

In the embodiment shown in Figs. 1 and 2, the base 10 is provided with a circular bead 14 on its lower surface, and has an annular groove 15 in the upper surface spaced from the outer edge thereof, and an inner annular track or groove 16 concentric with the outer groove 15. The cake or pie plate 11 is provided with a circular bead 17 registering with and seating within the groove 16 of the base wherein the plate may be turned about the center of the container as cake or pie is used therefrom. The lower edge of the cover is provided with a bead 18 that extends into the groove 15 of the base and the section 12 of the cover may be held stationary therein as by an overhang edge 15a for the corresponding portion of the groove 15, while the section 13 is opened about the connecting hinge 19 to the position shown in Fig. 4. With the section 13 open, the cake or pie may be sliced and used as desired.

The sections 12 and 13 of the cover may be provided with perforations 20 and 21 to permit circulation of air through the cover, and a knob 22 may be mounted on the section 13 by which the section may readily be opened. The section 13 may also be provided with a clip 23 in which a cake knife 24 may be held, and the knife may be provided with graduations 25 as illustrated in Fig. 3, wherein the cake may be scaled or measured before cutting.

Figure 5:
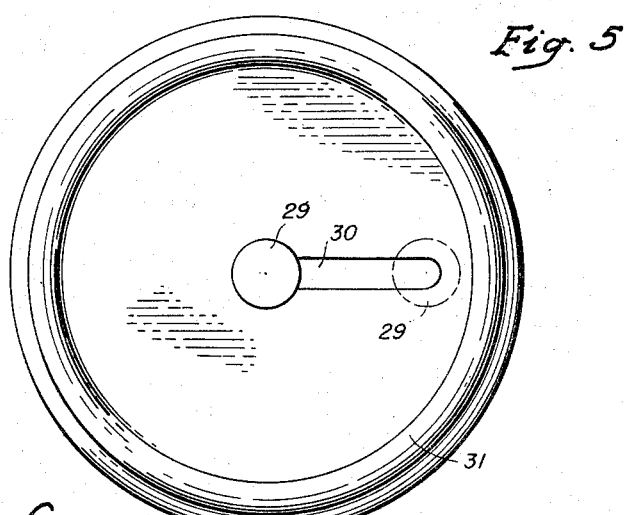
Fig. 5 is a plan view of the base of the cake or pie container shown in Fig. 4, the cover and cake or pie plate being omitted.
Figure 6:
Fig. 6 is a detail view showing a plate mounting bushing.
Figure 7:
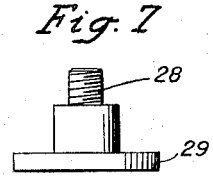
Fig. 7 is a detail view showing the spindle.

A modified construction for the cake or pie plate is shown in Figs. 4 and 5, wherein the cake or pie plate 26 is rotatably mounted on a bushing 27 which is internally threaded to receive threaded spindle 28 having a head 29 on the lower end; the spindle is slidably mounted in and extends through a slot 30 in a base 31. The cake plate 28 may thus be slid along the slot so that the plate with the cake thereon are projected outwardly as shown in broken and dash lines in Fig. 4, for ready removal of the cake or pie therefrom.

Although I have herein shown and described preferred constructional embodiments of my invention, it is obvious that changes in the size, rearrangement, shape or materials may be made to meet different food container requirements, without departing from the spirit and the scope of the invention as defined in the appended claims.

I claim:

1. In a storing and food serving container, a circular base having an annular groove in the upper surface spaced from the periphery thereof, a cylindrically shaped cover positioned on the base, said cover comprising two complementary sections hinged at the center and having their lower edges seated in said annular groove, said base having a part for retaining the lower edge of one of said sections in its groove portion, whereby the other section may be swung to uncover the base, and a food plate rotatably mounted on said base and radially slidable thereon.

2. In a storing and food serving container, a base having a circular groove in its upper surface adjacent the outer edge thereof, a semicircular cover section having a bead on its lower edge seated in said groove, an overhang portion on said base overhanging said bead, a complementary cover section seated in said groove, means hinging the complementary section to the first section, a cake or pie plate, said base having a slot, and means including a spindle rotatably mounting said food plate in said base, said spindle being slidable in said slot.

3. In a storing and food serving container, a base having an annular edge groove in its upper surface, said base having an overhang portion extending over one-half said groove, a half-cover section having a semi-circular lower edge seated in said one-half groove, said lower edge having a bead positioned beneath the overhang portion of the base, and a second half-cover section hinged to the first half-cover section and having its lower edge removably seated in the open portion of said groove.

FRED C. SCHNABEL.

REFERENCES CITED

The following references are of record in the file of this patent:

UNITED STATES PATENTS

| Number | Name | Date |
|---|---|---|
| 79,546 | Bulgin | July 7, 1868 |
| 239,237 | Forncrook | Mar. 22, 1881 |
| 1,619,423 | Korn | Mar. 1, 1927 |
| 2,027,198 | Rappold | Jan. 7, 1936 |
| 2,070,055 | Levien | Feb. 9, 1937 |